United States Patent [19]

Cummings

[11] Patent Number: 5,068,563
[45] Date of Patent: Nov. 26, 1991

[54] TAB INSULATORS FOR INSULATING ARMATURE CORE SLOTS

[75] Inventor: David H. Cummings, Waukesha, Wis.

[73] Assignee: Milwaukee Electric Tool Corporation, Brookfield, Wis.

[21] Appl. No.: 594,727

[22] Filed: Oct. 9, 1990

[51] Int. Cl.⁵ ............................................. H02K 1/22
[52] U.S. Cl. ...................................... 310/261; 310/42; 310/45; 310/194; 310/215
[58] Field of Search .................. 310/215, 45, 261, 269, 310/216, 233, 198, 195, 208, 42, 194

[56] References Cited

U.S. PATENT DOCUMENTS

| | | | |
|---|---|---|---|
| 2,473,332 | 6/1949 | England | 310/215 |
| 3,315,105 | 4/1967 | Moore, Jr. | 310/215 UX |
| 3,355,610 | 11/1967 | Staff | 310/215 |
| 3,679,925 | 7/1972 | Fort | 310/45 |
| 3,745,394 | 7/1973 | Mason | 310/215 |
| 3,882,336 | 5/1975 | Boyd | 310/216 |
| 4,400,639 | 8/1983 | Kobayashi | 310/215 |
| 4,833,353 | 5/1989 | Hansen | 310/216 |

FOREIGN PATENT DOCUMENTS 0947494 7/1956 Fed. Rep. of Germany ...... 310/215

Primary Examiner—R. Skudy
Attorney, Agent, or Firm—Michael, Best & Friedrich

[57] ABSTRACT

The invention provides an insulator for insertion in an armature core slot of a motor and for preventing an electrical connection between the core and wire wound in the armature core slots. The insulator includes, when it is mounted in an armature core slot, a first end aligned with an end of the core that faces a commutator included in the armature, and a second end aligned with the opposite end of the core. The insulator further includes a tab extending from the second end of the insulator. The tab is bent to prevent movement of the insulator in the slot and toward the commutator. The insulator optionally includes another tab extending from the first end of the insulator. The optional tab is bent to prevent movement of the insulator in the slot and away from the commutator.

9 Claims, 4 Drawing Sheets

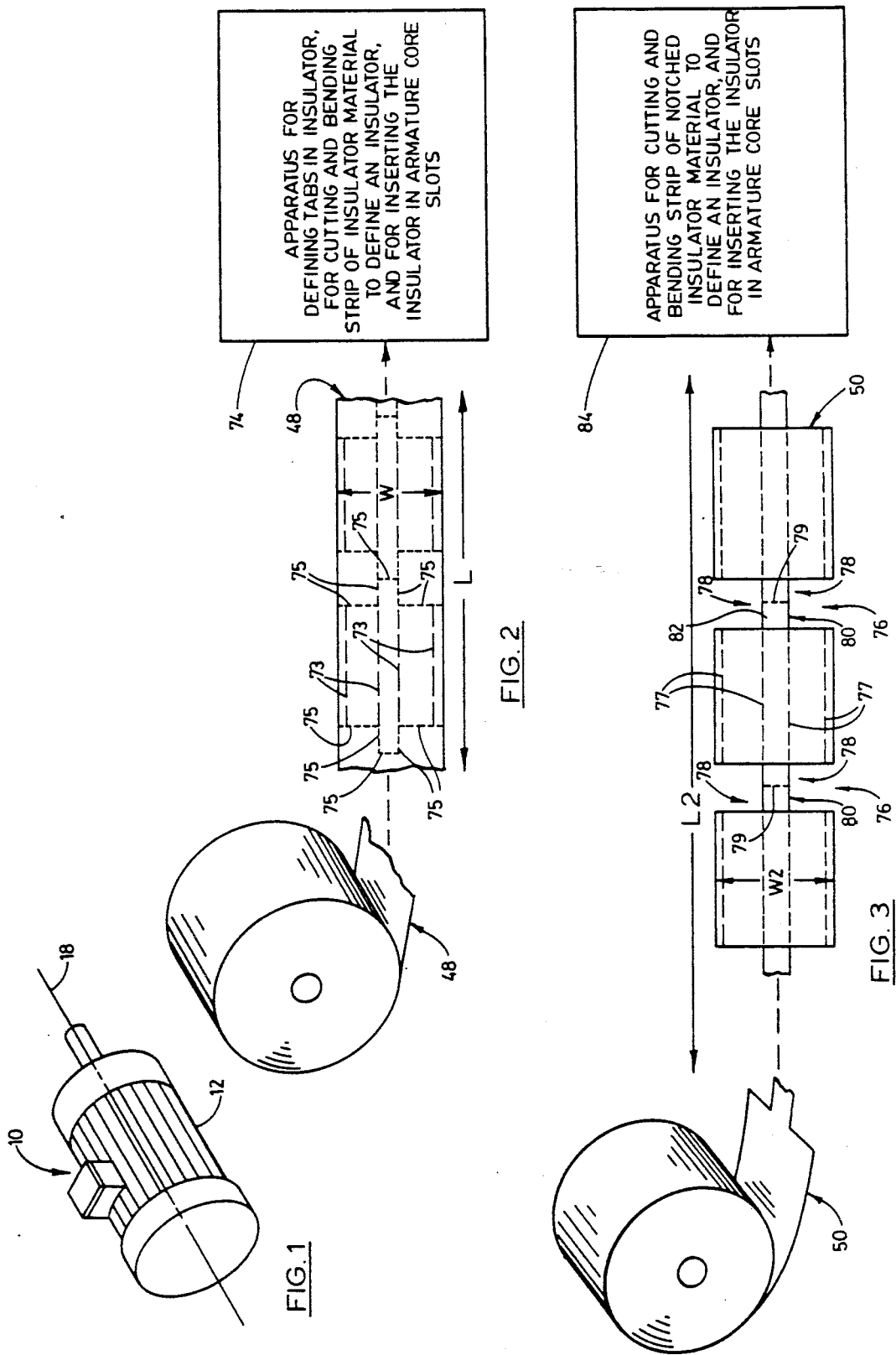

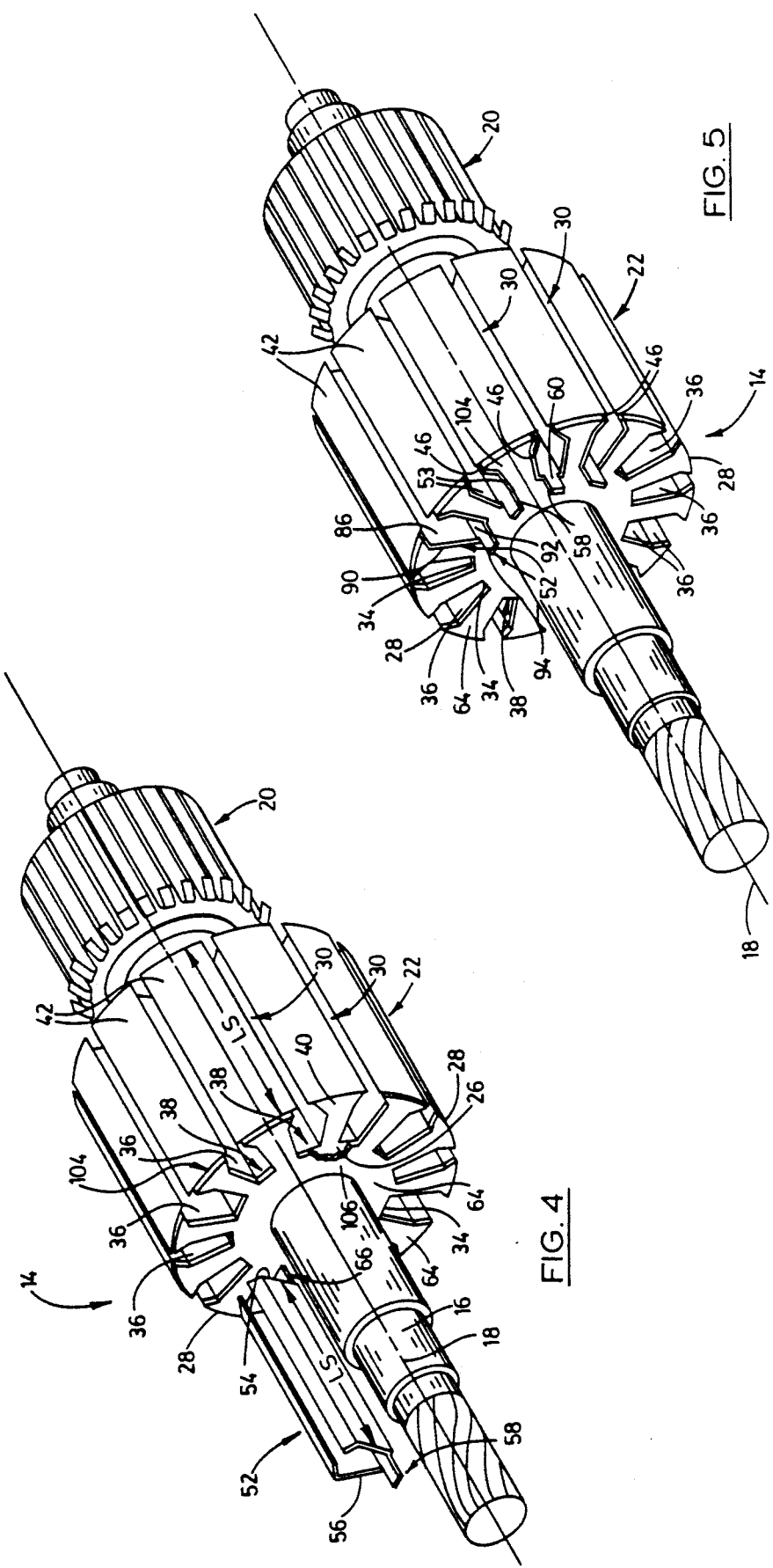

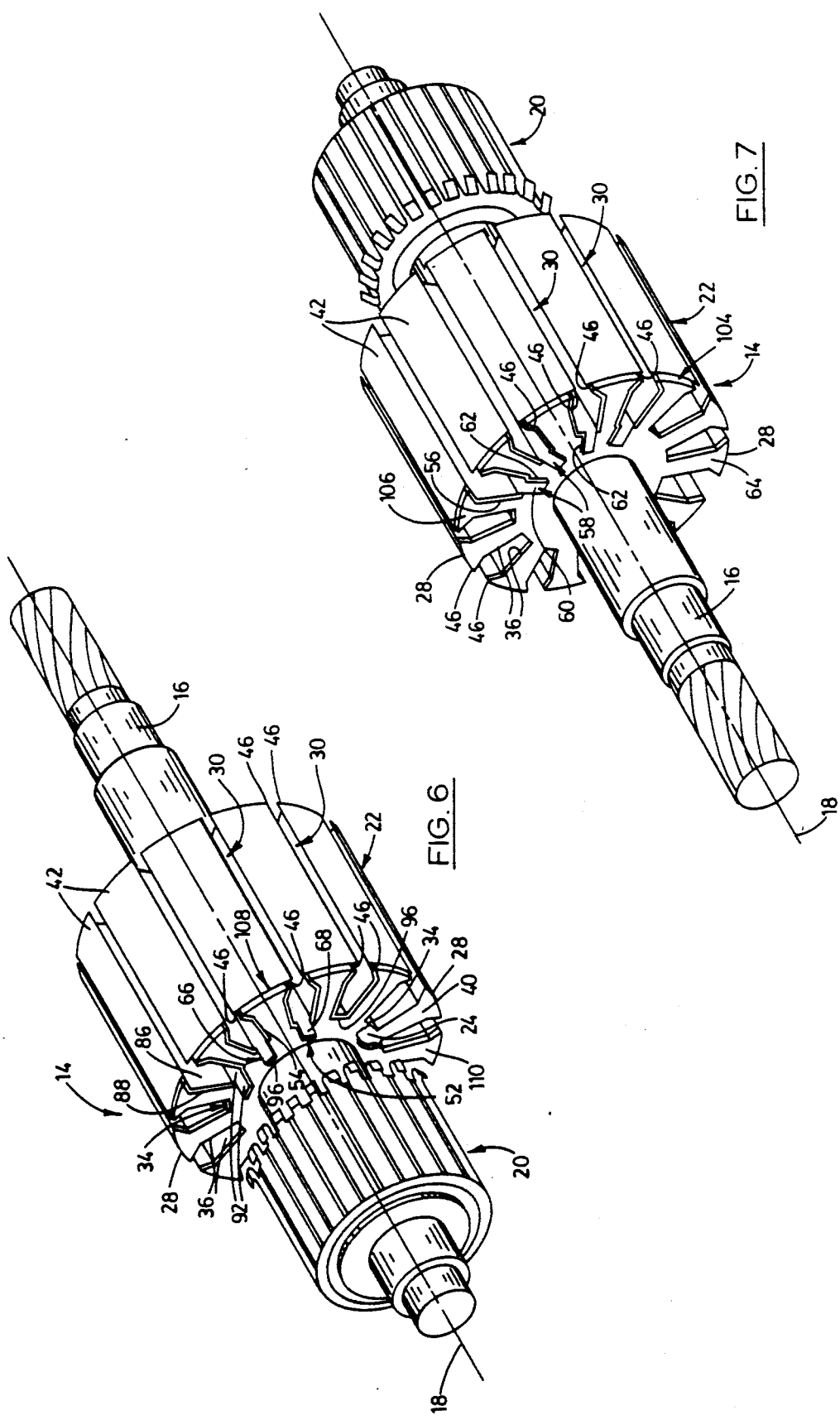

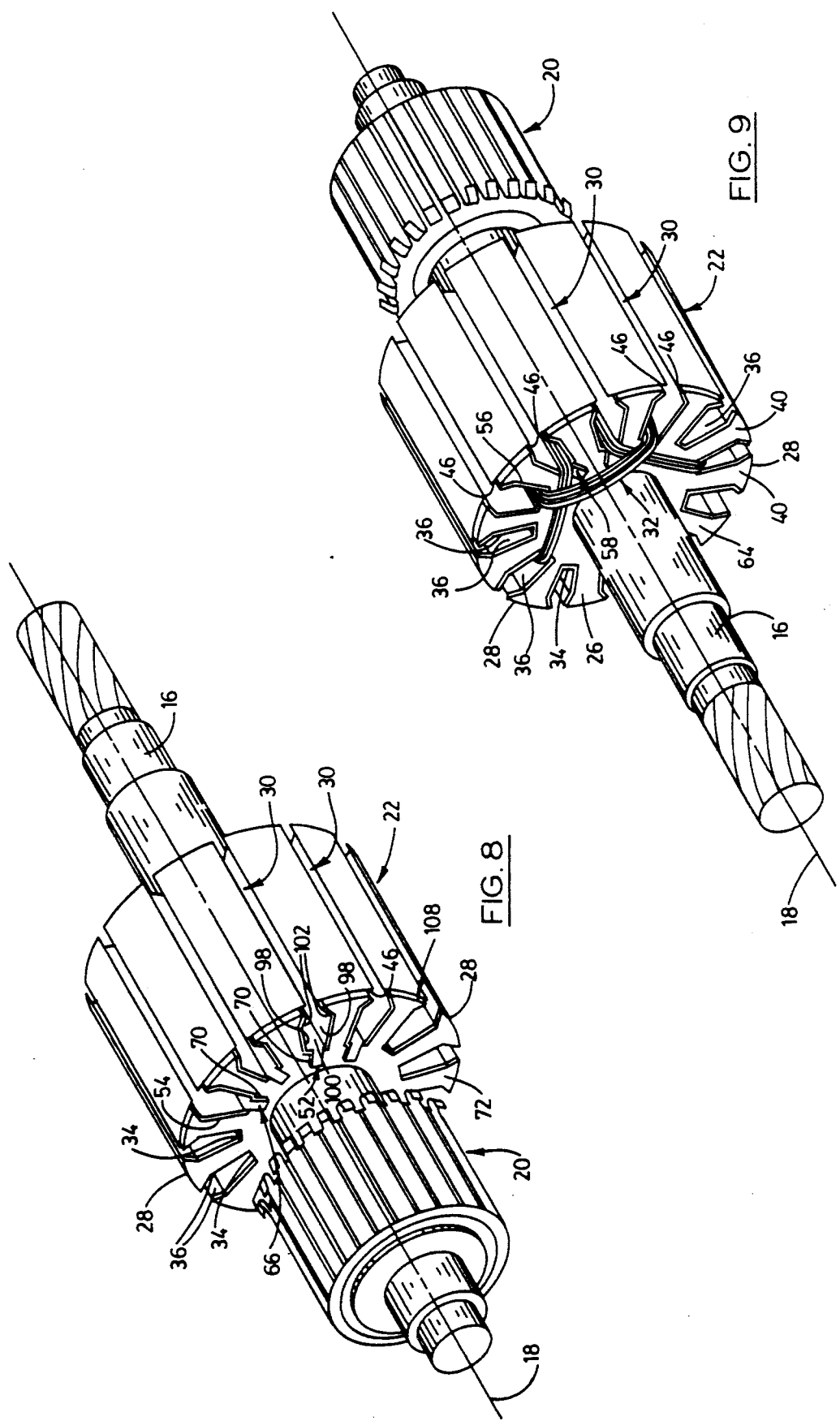

TAB INSULATORS FOR INSULATING ARMATURE CORE SLOTS

FIELD OF THE INVENTION

The invention relates generally to armatures for electric motors and, more particularly, to insulators for armature core slots that are adapted to have wire wound therein.

BACKGROUND OF THE INVENTION

It is known to insert paper, paper-mylar, or mylar insulators in slots (or channels) in a core of an armature to prevent electrical contact between wire wound in the slots and the core. Typically, a roll of insulation paper is fed between forming rolls to define a core slot insulator shape, is cut to a length corresponding to the axial length of the core, and is inserted into the core. Machines that use this process to insert insulators in each slot of an armature core are commercially available.

After the insulators are inserted into each slot of an armature core, wire is wound into the slots to define coils of wire. When a first strand of wire falls into one of the insulated slots, the wire tends to move the insulator axially in the direction in which the wire is wound.

If the insulator moves in the slot, a portion of the core may be exposed adjacent a wire. The wire may not thereafter be adequately insulated from the core. Further, at the other end of the core, the insulator will protrude from the end of the core and wound wire may split the insulator at the bend lines of the insulator, resulting in the wire travelling through the split and toward an exposed portion of the core. In either case, the wound armature may have to be scrapped or reworked.

In large armatures, washers may be provided on opposite ends of the armature core before wire is wound and after insulators are slid into the core slots. These washers overlap a radially inwardly located portion of each of the slots in the core and prevent axial movement of the insulators in the core slots. A problem with this approach is that the washers used are relatively expensive and use of washers requires additional manufacturing operations during assembly of an armature.

SUMMARY OF THE INVENTION

The invention provides an insulator for insertion in an armature core slot of a motor and for preventing an electrical connection between the core and wire wound in the armature core slots. The insulator includes, when it is mounted in an armature core slot, a main body portion having a first end aligned with an end of the core that faces a commutator included in the armature, and having a second end aligned with the opposite end of the core. The insulator further includes a tab extending from the first end, from the second end, or from both ends of the main body portion of the insulator. The tab extending from the second end (if such a tab is included) is bent to lie in a plane that is parallel to the opposite end of the core to prevent movement of the insulator in the slot and toward the commutator. The tab extending from the first end (if such a tab is included) is bent to lie in a plane that is parallel to the commutator end of the core to prevent movement of the insulator in the slot and away from the commutator.

In one aspect of the invention, one or both of the tabs are bent before wire is wound in the core slots.

In another aspect of the invention, one or both of the tabs (if not yet bent) are bent by wire as wire is wound in the core slots, and the wire cooperates with the tab(s) to prevent movement of the insulator in the slot.

In another aspect of the invention, the armature core slot is channel shaped, the insulator is correspondingly channel shaped and includes sidewalls and a bite portion connecting the sidewalls, and the tab(s) extend(s) from the bite portion.

Another aspect of the invention provides a method of manufacturing one of the above described insulators using a strip or roll of insulating material that has a length that is sufficient to manufacture at least two insulators, and that has a constant width along that length. Another aspect of the invention provides an alternative method of manufacturing one of the above described insulators using a strip or roll of insulating material that has a length that is sufficient to manufacture at least two insulators, and that has pairs of opposite notches at spaced intervals along its length, each pair of opposite notches defining a reduced width portion that is cut to separate one insulator from another such that at least a portion of the reduced width portion defines at least a portion of at least one tab for one or the other of the insulators.

These and other features and advantages of the invention will become apparent to one of ordinary skill in the art upon review of the following detailed description of the preferred embodiment of the invention, reference being made to the appended drawings.

BRIEF DESCRIPTION OF THE VIEWS OF THE DRAWINGS

FIG. 1 is a perspective view of a motor embodying various of the features of the invention.

FIG. 2 is a block diagram illustrating a method, in accordance with the invention, for manufacturing the motor of FIG. 1.

FIG. 3 is a block diagram illustrating an alternative method, in accordance with the invention, for manufacturing the motor of FIG. 1.

FIG. 4 is a partially exploded perspective view illustrating an armature core and an insulator that are included in the motor of FIG. 1, and illustrates a step that is included in the method of FIG. 2 or the method of FIG. 3. FIG. 4 illustrates a core end insulator that is partially broken away to show an end of the armature core.

FIG. 5 is a perspective view illustrating the insulator of FIG. 4 mounted in the armature core of FIG. 4.

FIG. 6 is a perspective view illustrating the insulator of FIG. 4 mounted in the armature core of FIG. 4 and illustrating a core end insulator partially broken away to show a commutator end of the armature core.

FIG. 7 is a perspective view illustrating the armature of FIG. 5 after a step that is optionally included in the method of FIG. 2 or the method of FIG. 3.

FIG. 8 is a perspective view illustrating the armature of FIG. 6 after a step that is optionally included in the method of FIG. 2 or the method of FIG. 3.

FIG. 9 is a perspective view illustrating the armature of FIG. 5 after wire is wound in the core slots of the armature.

DETAILED DESCRIPTION OF THE PREFERRED EMBODIMENT OF THE INVENTION

Illustrated in the various figures is a method of manufacturing a motor 10. The motor 10 includes a motor body 12 that supports a motor armature 14 for rotation.

The armature 14 includes a shaft 16 (see FIGS. 5-9) that is supportable for rotation in the motor body 12, and that defines an axis 18. The armature 14 further includes a commutator 20 on the shaft 16 and rotatable with the shaft 16.

The armature 14 further includes an armature core 22 on the shaft 16, rotatable with the shaft 16, and spaced from the commutator 20. The core 22 is defined by a lamination stack. The core 22 has an end 24 (see FIG. 6) facing the commutator 20, an opposite end 26 (see FIG. 4), and an outer generally cylindrical surface 28 including a plurality of radially spaced apart slots 30 extending radially inwardly therefrom and adapted to have wire 32 wound therein (see FIG. 9), each of the slots 30 extending in a direction generally parallel to the axis 18. Each of the slots 30 has a length LS (see FIG. 4) defined between the commutator facing end 24 and the opposite end 26 of the core 22.

Preferably the armature further comprises a core end insulator 104 (see FIGS. 4 and 7) on the opposite end 26 of the core, the core end insulator 104 being configured to prevent electrical contact between the opposite end 26 of the core 22 and wire 32 wound in the slots 30 the insulator 104 as an axially outer side 106 facing away from the core 22 and has an opposite side facing, and in contact with, the core 22 as shown in FIGS. 4 and 7.

Preferably, the armature further comprises a core end insulator 108 on the commutator facing end 24 of the core, the core end insulator 108 being configured to prevent electrical contact between the commutator facing end 24 of the core 22 and wire 32 wound in the slots 30 the insulator 108 as an axially outer side 110 facing away from the core 22 and has an opposite side facing, and in contact with, the core 22 as shown in FIG. 6.

While various slot configurations are possible, in the illustrated embodiment each of the slots 30 is channel shaped and includes a channel bottom surface 34, and channel side walls 36 transversely extending from the channel bottom surface 34. The channel bottom surfaces 34 collectively define an inner cylindrical surface 38 of the core 22, and adjacent sidewalls 36 of adjacent channel shaped slots (channels) 30 define spokes 40 (see FIGS. 4 and 6) extending radially outwardly from the inner cylindrical surface 38. The armature core 22 defines, on each spoke 40, an arcuate portion 42 of the outer cylindrical surface 28. Adjacent arcuate portions 42 define opposed ribs 46 that each define a portion of, and that together partially close, the channel 30 that the arcuate portions 42 are commonly adjacent to.

The method further comprises the step of providing a strip 48 or 50 (see FIGS. 2 and 3) of insulating material (preferably paper, paper-mylar, or mylar).

The method further comprises the step of cutting and bending the strip 48 or 50 to define an insulator 52 having a shape generally corresponding to the shape of one of the channels 30 for close sliding contact with the channel 30, and inserting the insulator 52 into one of the channels 30 in the armature core 22, such that the insulator 52 has a main body portion 53 (see FIG. 5) having an end 54 aligned with the commutator end 24 of the core 22, and having an end 56 aligned with the opposite end 26 of the core 22, and such that the insulator 52 has a tab 58 extending from the opposite end 26 and out of the channel 30, and such that at least a portion 60 of the tab 58 is selectively deformable (or bendable) to lie in a plane 62 that is generally parallel to a plane 64 defined by the opposite end 26 of the core. In one form of the invention, the insulator 52 further includes a tab 66 extending from the commutator facing end 24 and out of the channel 30, and such that at least a portion 68 of the tab 66 is selectively deformable (or bendable) to lie in a plane 70 that is generally parallel to a plane 72 defined by the commutator end 24 of the core. The insulator 52 has a length dimension extending between the end 54 and the end 56.

In one preferred embodiment of the invention, the strip of insulating material (see FIG. 2) is a strip 48 having a sufficient length L that a plurality of insulators 52 could be made from the strip 48. The strip 48 has a width W perpendicular to its length, and the strip 48 is bent along lines parallel to the length dimension L to define the channel shape. The strip has a constant width W, before the bending, cutting and inserting step, for a length L that is sufficient for two insulators 52 to be made from the strip 48. The method illustrated in FIG. 2 employs an apparatus 74 that includes forming rolls that bend the strip 48 on bend lines 73 that are illustrated with long dashes, and that includes a cutter that cuts the strip 48 along cut lines that are illustrated with short dashes, to perform the bending, cutting and inserting step to define the insulator 52. The apparatus 74 is preferably a conventional machine for cutting and bending a conventional strip 48, the machine being advantageously modified to cut the strip 48 along the cut lines 75.

In an alternative preferred embodiment of the invention, illustrated in FIG. 3, the strip of insulating material is a strip 50 of sufficient length L2 that a plurality of insulators 52 could be made from the strip 50. The strip 50 has a width W2 perpendicular to its length, and the strip 50 is bent along lines parallel to the length dimension L2 to define the channel shape. The strip 50 has pairs 76 of opposite notches 78 at a plurality of locations along the length L2 of the strip 50, before the cutting, bending, and inserting step. Each pair 76 of opposite notches 78 defines a reduced width connecting portion 80. The bending, cutting, and inserting step includes the step of cutting the strip 50 at one of the reduced width portions 80 such that at least a portion 82 of the one reduced width portions 80 defines at least one tab 58 or 66. More particularly, in the preferred embodiment, the cutting, bending, and inserting step comprises the step of cutting the strip 50 across the one of the reduced width portions 80 to separate one insulator 50 from an adjacent insulator 50 and to define the tab 58 or 66 of the one insulator 50 and to define a tab 58 or 66 of the adjacent insulator 50. The method illustrated in FIG. 3 employs an apparatus 84 that includes forming rolls that bend the strip 48 on bend lines 77 that are illustrated with long dashes, and that includes a cutter that cuts the strip 48 along cut lines 79 that are illustrated with short dashes, to perform the bending, cutting and inserting step to define the insulator 52.

Although the cut lines and bend lines illustrated in FIGS. 2 and 3 are used to define insulators 52 having lengths (between the end 54 and the end 56 of each insulator) parallel to the length L or L2 of the strip 48 or 50 from which the insulators are defined, the bend and cut lines could be arranged in other configurations, for example, to define the lengths of each insulator (between the end 54 and the end 56 perpendicularly to the length L or L2.

While other methods of manufacturing the insulator 52 can be used, and while insulators differing from the insulator 52 can be used, in the preferred embodiment the insulator 52 formed by either the method of FIG. 2 or the method of FIG. 3 is used to define an armature, in accordance with the invention, comprising insulator means, slidably mounted in one of the slots 30, for preventing an electrical connection between the core 22 and wire 32 wound in the slots 30, wherein the insulator means comprises a main body portion 53 having an end 54 aligned with the commutator facing end 24 of the core 22, an end 56 aligned with the opposite end 26 of the core 22, and wherein the main body portion 53 further includes tab means 58 extending from the opposite end 26 of the main body portion 53 and for preventing movement of the main body portion 53 of the insulator means in the slot in a direction parallel to the axis 18 and toward the commutator 20, the tab means 58 extending out of the slot 30. Preferably, the insulator means used to define the armature further comprises tab means 66 extending from the commutator facing end 24 of the main body portion 53 and for preventing movement of the main body portion 53 of the insulator means in the slot in a direction parallel to the axis 18 and away from the commutator 20, the tab means 58 extending out of the slot 30.

Alternatively stated, while other methods of manufacturing the insulator 52 can be used, and while insulators differing from the insulator 52 can be used, in the preferred embodiment the insulator 52 formed by either the method of FIG. 2 or the method of FIG. 3 is used to define an armature, in accordance with the invention, comprising an insulator slidably mounted in one of the armature slots 30, the insulator including a portion 86 having an end 88 (see FIG. 6) aligned with the commutator facing end 24 of the core 22 and having an end 90 (see FIG. 5) aligned with the opposite end 26 of the core 22, and including a portion 92 having a length longer than the length LS of the slot 30 in which the insulator 52 is mounted. The portion 92 has an end 94 extending out of the slot 30 past the opposite end 26 of the core 22 to define the tab 58. The portion 92 further has an end 96 (see FIG. 6) that is either aligned with the commutator facing end 24 of the core 22, or that extends out of the slot 30 past the commutator facing end 24 of the core 22 to define the tab 66.

Preferably, the armature provided by the invention comprises an insulator (or insulator means) 52, having a tab (or tab means) 58 and optionally further having a tab (or tab means) 66, in all of the slots 30 of the armature.

Preferably, at least the portion 60 of the tab (or tab means) 58 lies in the plane 62 that is generally parallel to the plane 64 defined by the opposite end 26 of the core 22 to perform the function of preventing movement of the ends 54 and 56 of the insulator (or insulator means) 52 in the direction parallel to the axis 18 and toward the commutator 20.

Preferably, at least the portion 68 of the tab (or tab means) 66 lies in the plane 70 that is generally parallel to the plane 72 defined by the commutator facing end 24 of the core 22 to perform the function of preventing movement of the ends 54 and 56 of the insulator (or insulator means) 52 in the direction parallel to the axis 18 and away from the commutator 20.

Preferably, when the insulator (or insulator means) 52 of the armature provided by the invention is in one of the armature slots 30, the tab (or tab means) 58 is appropriately located in the slot 30, and is appropriately bendable, so as to be bent by wire 32, to lie in the plane 62, when wire is wound in the slot 30. Then, the wire 32 wound in the slot 30 will cooperate with the tab (or tab means) 58 to prevent the insulator (or insulator means) 52 from sliding in the slot 30.

Preferably, when the insulator (or insulator means) 52 is in one of the armature slots 30, the tab (or tab means) 66 is appropriately located in the slot 30, and is appropriately bendable, so as to be bent by wire 32, to lie in the plane 70 when wire 32 is wound in the slot 30. Then, the wire 32 wound in the slot 30 will cooperate with the tab (or tab means) 66 to prevent the insulator 52 from sliding in the slot 30.

Preferably, the insulator (or insulator means) 52 of the armature of the invention has a shape generally corresponding to the shape of the channel 30 in which the insulator (or insulator means) 52 is mounted, and the insulator (or insulator means) 52 comprises opposed sides 98 (see FIG. 8), each of the opposed sides 98 being in close contact with one of the sidewalls 36 of the channel 30 in which the insulator (insulator means) 52 is mounted, a bite portion 100 transverse to each of the opposed sides 98 and connecting the opposed sides 98, the bite portion 100 being in close contact with the channel bottom surface 34 of the channel 30 in which the insulator (or insulator means) 52 is mounted, and an inwardly extending flange 102 extending from each of the opposed sides 98, each of the inwardly extending flanges 102 being in close contact with one of the opposed ribs 46, and the tab (or tab means) 58 extends from the bite portion 100 of the insulator (or insulator means) 52. The optional tab (or tab means) 68, if included in the insulator (or insulator means) 52, also extends from the bite portion 100.

Preferably, at least the portion 60 of the tab (or tab means) 58 lies in a plane parallel to the plane defined by the core end insulator 104 and lies in contact with the core end insulator 104. Although the armature 14 could be manufactured with the tap (or tab means) 58 in another location, in the preferred embodiment, the tab (or tab means) 58 lies against an axially outer side 106 (see FIGS. 4 and 7) of the core end insulator 104, with respect to the axis 18.

Preferably, at least the portion 68 of the optional tab (or tab means) 66, if included, lies in a plane parallel to the plane defined by the core end insulator 108 and lies in contact with the core end insulator 108. Although the armature 14 could be manufactured with the tab (or tab means) 66 in another location, in the preferred embodiment, the tab (or tab means) 66, if included, lies against an axially outer side 110 of the core end insulator 104, with respect to the axis 18.

Preferably, the opposite end 26 of the core 22 is generally planar, and the core end insulator 104 is also generally planar.

While a preferred embodiment of the invention has been disclosed by way of example, various obvious modifications will become available to those of ordinary skill in the art. Thus, the scope of the invention is only to be limited by the spirit and scope of the appended claims.

I claim:

1. An armature comprising:

a shaft supportable for rotation in a motor body and defining an axis;

a commutator on said shaft and rotatable with said shaft;

an armature core on said shaft, rotatable with said shaft and spaced from said commutator, said core having an end facing said commutator, an opposite end, and an outer generally cylindrical surface including a plurality of spaced apart slots adapted to have wire wound therein, each of the slots extending in a direction generally parallel to the axis;

a core end insulator on said opposite end of said core, said core end insulator having a side facing said core and having a side facing away from said core; and insulator means, slidably mounted in one of said slots, for preventing an electrical connection between said core and wire wound in the slots, said insulator means comprising a main body portion having a first end generally aligned with said commutator facing end of said core, and having a second end generally aligned with said opposite end of said core, and said insulator means further comprising tab means extending from said second end of said main body portion and for preventing movement of said insulator means in said one of said slots in a direction parallel to the axis, said tab means extending out of said one of said slots and being bendable against the side of said core end insulator facing away from said core.

2. An armature as set forth in claim 1 and further comprising a second core end insulator on said commutator facing end of said core, said core end insulator having a side facing said core and having a side facing away from said core, and a second tab means extending from said first end of said insulator means and for preventing movement of said insulator means and for preventing movement of said insulator means in said one of said slots in a direction parallel to the axis, said second tab means extending out of said one of said slots and being bendable against the side of the second core end insulator facing away from said core.

3. An armature as set forth in claim 1 wherein said tab means is formed of insulating material, and said tab means and said insulator means both comprise the same type of insulating material.

4. An armature as set forth in claim 1 wherein one of said insulator means is mounted in each of said slots.

5. An armature as set forth in claim 1 wherein said tab means is located so as to be bent by the wire, when said armature is wound with the wire, to lie in a plane that is generally parallel to a plane defined by the opposite end of said core.

6. An armature as set forth in claim 1 wherein each of said slots is channel shaped and includes a channel bottom surface, and channel side walls transversely extending from said channel bottom surface, wherein said channel bottom surfaces collectively define an inner cylindrical surface of said core, wherein adjacent sidewalls of adjacent channels define spokes extending radially outwardly from said inner cylindrical surface, wherein said armature core defines, on each spoke, an arcuate portion of said outer cylindrical surface, wherein adjacent arcuate portions define opposed ribs that each define a portion of, and that together partially close, the channel that said arcuate portions are commonly adjacent to, wherein said insulator means has a shape generally corresponding to the shape of the channel in which said insulator means is mounted, wherein said insulator means comprises opposed sides, each of the opposed sides being in close contact with one of the sidewalls of said channel in which said insulator means is mounted, a bite portion transverse to each of said opposed sides and connecting said opposed sides, said bite portion being in close contact with said channel bottom surface of said channel in which said insulator means is mounted, and an inwardly extending flange extending from each of said opposed sides, each of said inwardly extending flanges being in close contact with one of the opposed ribs that partially define said channel in which said insulator is mounted, and wherein said tab means extends from said bite portion of said insulator means.

7. An armature comprising:

a shaft supportable for rotation in a motor body and defining an axis;

a commutator on said shaft and rotatable with said shaft;

a generally cylindrical armature core on said shaft, rotatable with said shaft and spaced from said commutator, said core having an end facing said commutator, an opposite end, an outer cylindrical surface, and a plurality of radially spaced slots adapted to have wire wound therein and defined radially inwardly from said outer cylindrical surface, each of the slots extending in a direction generally parallel to the axis and having a length defined between said commutator facing end and said opposite end of said core;

a first core end insulator on said opposite end of said core, said core end insulator having a side facing said core and having a side facing away from said core;

a second core end insulator on said commutator facing end of said core, said second core end insulator having a side facing said core and having a side facing away from said core; and an insulator slidably mounted in one of said slots, said insulator including a first portion having a first end generally aligned with said commutator facing end of said core and having a second end generally aligned with said opposite end of said core, said insulator including a second portion having a length longer than the length of the slot in which said insulator is mounted, said second portion having a first end extending out of said slot past said opposite end of said core to define a first tab between said first end of said second portion and said opposite end of said core, said second portion further having a second end extending out of said slot past said commutator facing end of said core to define a second tab between said second end of said second portion and said commutator facing end of said core, and said second portion having an intermediate portion in said slot, at least a portion of said first tab being bendable relative to the intermediate portion of said second portion against the side of said first core end insulator facing away from said core, and at least a portion of said second tab being bendable, relative to the intermediate portion of said second portion, against the side of said second core end insulator facing away from said core, said first and second tabs being bendable to prevent axial movement of said insulator in said slot at least when wire is wound in said slot.

8. A motor comprising:

a motor body;

an armature including a shaft supported for rotation in said motor body and defining an axis, said armature including a commutator on said shaft and rotatable with said shaft, said armature including a generally cylindrical armature core on said shaft, rotatable with said shaft and spaced from said commutator, said core having an end facing said commutator, an opposite end, an outer cylindrical surface, and a plurality of radially spaced slots adapted to have wire wound therein defined radially inwardly from said outer cylindrical surface, each of the slots extending in a direction generally parallel to the axis and having a length defined between said commutator end and said opposite end of said core, said armature further comprising a core end insulator on said opposite end of said core, said core end insulator having a side facing said core and having a side facing away from said core, and said armature including insulator means, slidably mounted in each of said slots, for preventing an electrical connection between said core and wire wound in the slots, each insulator means comprising a main body portion having a first end including a portion aligned with said commutator facing end of said core, and having a second end including a portion aligned with said opposite end of said core, and at least one of said insulator means including tab means extending from said second end of said main body portion of said one insulator means and for preventing movement of said one insulator means, in the slot in which said one insulator means is mounted, in a direction parallel to the axis and away from the commutator, said tab means extending out of the slot in which said one insulator means is mounted; and wire wound in each of said slots, said wire engaging said tab means and bending said tab means of said one insulator means against the side of said first core end insulator facing away from said core to prevent movement of said one insulator means, in the slot in which said one insulator means is mounted, in a direction parallel to the axis and away from the commutator.

9. An armature comprising:

a core that includes a plurality of radially spaced slots, each of the slots being channel shaped and including a channel bottom surface, and channel side walls transversely extending from the channel bottom surface, the channel bottom surfaces collectively defining an inner cylindrical surface of the core, adjacent sidewalls of adjacent channels defining spokes extending radially outwardly from said inner cylindrical surface, each spoke defining a portion of adjacent slots, said spokes collectively defining an outer cylindrical surface, adjacent spokes defining opposed ribs that partially close the slot that the opposed ribs commonly partially define, said core having opposite ends transverse to both of said inner and outer cylindrical surfaces;

a core end insulator on one of said opposite end of said core, said core end insulator having a side facing said core and having a side facing away from said core; and an insulator mounted in one of said slots, said insulator having a shape generally corresponding to the shape of the one slot in which said insulator is mounted, said insulator including opposed sides, each of the opposed sides being in close contact with one of the sidewalls of the channel in which the insulator is mounted, a bite portion transverse to each of said opposed sides and connecting said opposed sides, said bite portion being adapted to be in close contact with the channel bottom surface of the channel in which said insulator is mounted, an inwardly extending flange extending from each of said opposed sides, each of said inwardly extending flanges being in close contact with one of the opposed ribs that partially define the channel in which said insulator is mounted, and a tab extending from said bite portion of said insulator, said tab extending out of the channel, and at least a portion of said tab being bendable relative to said bite portion of said insulator and against said side of said core end insulator facing away from said core.

* * * * *